(12) United States Patent
Pruet

(10) Patent No.: US 7,901,578 B2
(45) Date of Patent: Mar. 8, 2011

(54) METHOD AND SYSTEM FOR TREATING AN AQUEOUS STREAM IN THE PRODUCTION OF HYDROCARBON

(75) Inventor: Randall Boyd Pruet, Hellerup (DK)

(73) Assignee: Chevron U.S.A. Inc., San Ramon, CA (US)

( * ) Notice: Subject to any disclaimer, the term of this patent is extended or adjusted under 35 U.S.C. 154(b) by 424 days.

(21) Appl. No.: 12/104,650

(22) Filed: Apr. 17, 2008

(65) Prior Publication Data

US 2009/0261040 A1    Oct. 22, 2009

(51) Int. Cl.
*B01D 61/00* (2006.01)
*B01D 61/24* (2006.01)
*B01D 37/00* (2006.01)
*A61M 1/16* (2006.01)

(52) U.S. Cl. ...... 210/644; 210/649; 210/767; 210/195.1; 210/195.2; 210/257.2

(58) Field of Classification Search ............ 210/644, 210/652, 649, 767, 651, 641, 195.2, 257.2
See application file for complete search history.

(56) References Cited

U.S. PATENT DOCUMENTS

| | | | | |
|---|---|---|---|---|
| 3,906,259 A | * | 9/1975 | Nicholas et al. | 327/77 |
| 4,781,837 A | * | 11/1988 | Lefebvre | 210/640 |
| 5,098,575 A | * | 3/1992 | Yaeli | 210/652 |
| 5,281,430 A | * | 1/1994 | Herron et al. | 426/490 |
| 6,391,205 B1 | * | 5/2002 | McGinnis | 210/644 |
| 7,455,109 B2 | * | 11/2008 | Collins | 166/275 |
| 7,560,029 B2 | * | 7/2009 | Mc Ginnis | 210/644 |
| 7,727,400 B2 | * | 6/2010 | Flynn | 210/652 |
| 2006/0144789 A1 | * | 7/2006 | Cath et al. | 210/641 |
| 2007/0246426 A1 | | 10/2007 | Collins | |

FOREIGN PATENT DOCUMENTS

| WO | 2007147013 A1 | 12/2007 |
|---|---|---|
| WO | WO2007147013 | 12/2007 |

OTHER PUBLICATIONS

"Lessons Learned from the Development of Advanced Life Support Systems for Space Applications" 44 pgs, obtained from http://www.rmwea.org/tech_papers/reuse/2006_Reuseit/B1-Cath-0900.ppt.
PCT Search Report PCT/US2009/038512 11 pages.

* cited by examiner

*Primary Examiner* — Ana M Fortuna
(74) *Attorney, Agent, or Firm* — Nicholas Gallo; Frank Turner; Karen R. DiDomenicis

(57) ABSTRACT

A method and system for treating an aqueous stream in the production of hydrocarbon are provided. An osmotic operation is performed between the stream of produced water and a stream of draw fluid to transfer water from the produced water to the draw fluid, thereby diluting the draw fluid to form a stream of diluted draw fluid and concentrating the produced water to form a stream of concentrated produced water. The concentration of the produced water can facilitate the subsequent removal of contaminants therefrom, and, in some cases, the diluted draw fluid can be re-used, e.g., for injection into the well of the hydrocarbon production operation or as a fertilizing fluid.

5 Claims, 7 Drawing Sheets

US 7,901,578 B2

METHOD AND SYSTEM FOR TREATING AN AQUEOUS STREAM IN THE PRODUCTION OF HYDROCARBON

BACKGROUND OF THE INVENTION

1. Field of the Invention

This invention relates to the treatment of aqueous fluids in the production of hydrocarbon and, more particularly, to a system and method for treating produced water from a hydrocarbon production operation.

2. Description of Related Art

With the production of crude oil and other hydrocarbons, there is normally an associated aqueous stream that results. This aqueous stream is typically contaminated with dissolved minerals and both dissolved and suspended hydrocarbon and water soluble treating chemicals. There is an increasing public interest in reducing the quantity of contaminants that are released to the environment by or during the disposal of this stream. Conventional methods for treating this aqueous stream to remove contaminants typically reduce the amount of suspended hydrocarbon and, in some cases, can achieve low levels of suspended hydrocarbon; however, such conventional methods typically do not provide significant or sufficient removal of dissolved contaminants. In fact, conventional technology and methods that have been developed over the last several decades typically reduce contaminant content by multiple sequential processing steps, such as by successive filtering operations. Although such methods can successively reduce contaminants, and although advancements in conventional techniques have generally resulted in increased contaminant reduction, aqueous streams treated in this manner still can contain contaminants. In some cases, the suspended hydrocarbon content in such aqueous streams is undesirably high. Further, conventional methods such as filtering may provide little or no reduction in the dissolved hydrocarbon or other contaminant content of the stream.

Thus, a need exists for an improvement in the methods and systems for removal of contaminants, especially hydrocarbons, from aqueous streams associated with the production of crude oil and other hydrocarbons. The methods and systems should be capable of providing a water stream in which the hydrocarbon content is less than a predetermined limit, typically little or no hydrocarbon content.

SUMMARY OF THE INVENTION

The embodiments of the present invention generally provide systems and methods useful for separating water from a contaminated stream of produced water that results from a hydrocarbon production operation. By reducing the volume of the produced water, the concentration of hydrocarbon, dissolved contaminants, and scale in the produced water can be increased. This reduction in volume and accompanying concentration of the produced water can facilitate disposal of the produced water and/or the removal of contaminants from the produced water. Further, in some cases, the concentrated produced water can be used or re-used in the operation, e.g., to solution mine salt. If a mining operation is performed, a resulting cavern produced by the mining operation can be used for separation and/or storage of the concentrated produced water. Also, the system and method can separate and recover valuable hydrocarbon from the concentrated produced water. If salt is excavated as part of the operation, the stream of brine (i.e., salty or salt-saturated water) from the salt mine can be put to beneficial use, e.g., as the draw fluid in the osmotic operation. Further, the diluted draw fluid (such as diluted salt water) that is produced by the transfer of water to the draw fluid in the osmotic operation can be suitable, and in some cases superior, for various uses, such as in an enhanced oil recovery operation, typically in the same hydrocarbon production operation from which the produced water is derived. In other cases, such as where the draw fluid contains ammonia, the diluted draw fluid can be used for irrigation and fertilization in a farming operation. Relative to produced water that is filtered by conventional methods, the diluted draw fluid that is provided by the systems and methods of the present invention can have a significantly lower concentration of hydrocarbons, typically no (or substantially no) hydrocarbon.

According to one embodiment of the present invention, there is provided an osmotic method for treating an aqueous stream in the production of hydrocarbon. The method includes providing a stream of produced water formed in a production of hydrocarbon, the produced water including dissolved minerals, hydrocarbon, and/or other contaminants. For example, the stream of produced water can be an aqueous stream that includes water with dissolved hydrocarbon and suspended hydrocarbon. A stream of draw fluid, such as a solution that is saturated or supersaturated with salt water, is also provided. The method further includes performing an osmotic operation between the produced water and the draw fluid to transfer clean water from the produced water to the draw fluid, thereby diluting the draw fluid to form a stream of diluted draw fluid and concentrating the produced water to form a stream of concentrated produced water. The osmotic operation can be a direct osmotic operation that includes exposing the produced water and the draw fluid to opposite sides of a semi-permeable osmotic membrane. In some cases, the osmotic operation decreases the volume of the produced water by at least about 10%, e.g., by as much as about 90% in some cases.

A plurality of osmotic operations can be performed in a plurality of osmotic devices. For example, the osmotic operation between the produced water and the draw fluid can be a first osmotic operation that is performed in a first osmotic device, and the method can also include performing a subsequent osmotic operation between the diluted draw fluid and a supply of seawater in a second osmotic device so that water is transferred from the seawater to the diluted draw fluid. In addition or alternative, the produced water can be subjected to an additional osmotic operation. For example, the osmotic operation between the produced water and the draw fluid can be a first osmotic operation that is performed in a first osmotic device, and the method can include performing a second osmotic operation, prior to the first osmotic operation, between the produced water and a supply of seawater in a second osmotic device so that water is transferred from the seawater to the produced water. One or more of the osmotic operations can be performed in an osmotic device that is located in large accumulation or body of water, e.g. an ocean, so that clean water is received from the seawater via the osmotic operation.

In some cases, the diluted draw fluid is injected into a well in an enhanced oil recovery operation for the production of hydrocarbon, e.g., the hydrocarbon production operation that provides the produced water. In addition or alternative, the concentrated produced water can be used in a salt solution mining operation. For example, in one embodiment, the method is a substantially closed-loop operation that includes injecting the diluted draw fluid into a well in an enhanced oil recovery operation for the production of hydrocarbon, wherein the stream of produced water is produced from a well, and using the concentrated produced water in a salt solution mining operation, wherein the stream of draw fluid is a stream of salt water produced from the salt solution mining operation. The concentrated produced water can dissolve salt in the mining operation to become saturated or supersaturated with salts. The increase in salinity promotes a decrease in hydrocarbon solubility and therefore aids in the separation of hydrocarbon from the concentrated produced water. The resulting mixture can be stratified in a salt mine so that hydrocarbons in the concentrated produced water rise to an upper level in the salt mine, solids in the concentrated produced water sink to a lower level, and the stream of draw fluid is provided from an intermediate level between the upper and lower levels.

A plurality of direct and reverse osmotic operations can be performed in a plurality of osmotic devices. For example, the osmotic operation between the produced water and the draw fluid can be a first osmotic operation that is performed in a first direct osmotic device, and the method can also include performing a subsequent reverse osmotic operation in a second osmotic device in which the diluted draw fluid is concentrated by removing a stream of water. In addition, the concentrated draw fluid produced in a second (reverse) osmotic device can be connected to a first direct osmotic device providing for the concentration of produced water.

In another embodiment, a fluid that includes ammonia is provided as the stream of draw fluid, and the osmotic operation between the produced water and the draw fluid includes transferring water from the produced water to the draw fluid, thereby diluting the ammonia of the draw fluid to form the stream of diluted draw fluid and concentrating the produced water to form the stream of concentrated produced water. The diluted draw fluid can be provided as a fertilizer.

According to another embodiment of the present invention, there is provided an osmotic system for treating an aqueous stream in the production of hydrocarbon. The system includes an osmotic device defining a first flow path extending from a first inlet to a first outlet, and a second flow path extending from a second inlet to a second outlet. The first inlet is configured to receive a stream of produced water formed in a production of hydrocarbon, and the second inlet is configured to receive a stream of draw fluid. The osmotic device is configured to perform an osmotic operation between the produced water flowing along the first flow path and the draw fluid flowing along the second flow path to transfer clean water from the produced water to the draw fluid, thereby diluting the draw fluid to form a stream of diluted draw fluid and concentrating the produced water to form a stream of concentrated produced water. For example, the osmotic device can include a semi-permeable osmotic membrane that is disposed between the first and second flow paths so that water in the produced water flowing along the first flow path is transferred by direct osmosis through the membrane to the draw fluid flowing along the second flow path. A first source can be configured to provide the stream of produced water as an aqueous stream that includes water with dissolved hydrocarbon and suspended hydrocarbon. A second source can be configured to provide the stream of draw fluid as a solution that is saturated or supersaturated with salt water. In some cases, the osmotic device can be configured to decrease the volume of the produced water by at least about 10%.

The system can include a plurality of osmotic devices for performing a plurality of osmotic operations. For example, the osmotic device can be a first osmotic device, and the system can further include a second osmotic device that is configured to receive the diluted draw fluid and perform a subsequent osmotic operation between the diluted draw fluid and a supply of seawater so that water is transferred from the seawater to the diluted draw fluid. In addition or alternative, the system can include additional osmotic device(s). For example, in one case, the osmotic device is a first osmotic device, and the system includes a second osmotic device configured to receive the produced water and a supply of seawater and transfer water from the seawater to the produced water before the produced water is provided to the first osmotic device. One or more of the osmotic devices can be located in a body of water such as an ocean so that water is received from the body of water via the osmotic operation(s) performed in the osmotic device(s).

In some cases, the system further includes an injector that is configured to inject the diluted draw fluid into a well in an enhanced oil recovery operation for the production of hydrocarbon. In addition or alternative, the first outlet can be fluidly connected to a salt solution mine so that the concentrated produced water is provided to a salt solution mining operation therein. For example, in one embodiment, the second outlet is fluidly connected to an injector that is configured to inject the diluted draw fluid into a well in an enhanced oil recovery operation for the production of hydrocarbon, and the stream of produced water is produced from the well. The first outlet is fluidly connected to a salt mine so that the concentrated produced water is provided to a salt solution mining operation in the mine, and the stream of draw fluid is a stream of salt water produced from the salt solution mining operation so that the system is a substantially closed-loop system. The first inlet can be connected to an intermediate level in the salt mine to receive the stream of draw fluid between an upper level characterized by a relatively high concentration of hydrocarbons in the concentrated produced water and a lower level characterized by a relatively high concentration of solids in the concentrated produced water.

In another embodiment, the system includes a fluid source that is configured to provide a fluid including ammonia to the second inlet as the stream of draw fluid. The osmotic device is configured to transfer water from the produced water to the draw fluid, thereby diluting the ammonia of the draw fluid to form the stream of diluted draw fluid and concentrating the produced water to form the stream of concentrated produced water. A fertilizer receiver can be configured to receive the diluted draw fluid.

BRIEF DESCRIPTION OF THE DRAWINGS

Figure 1:
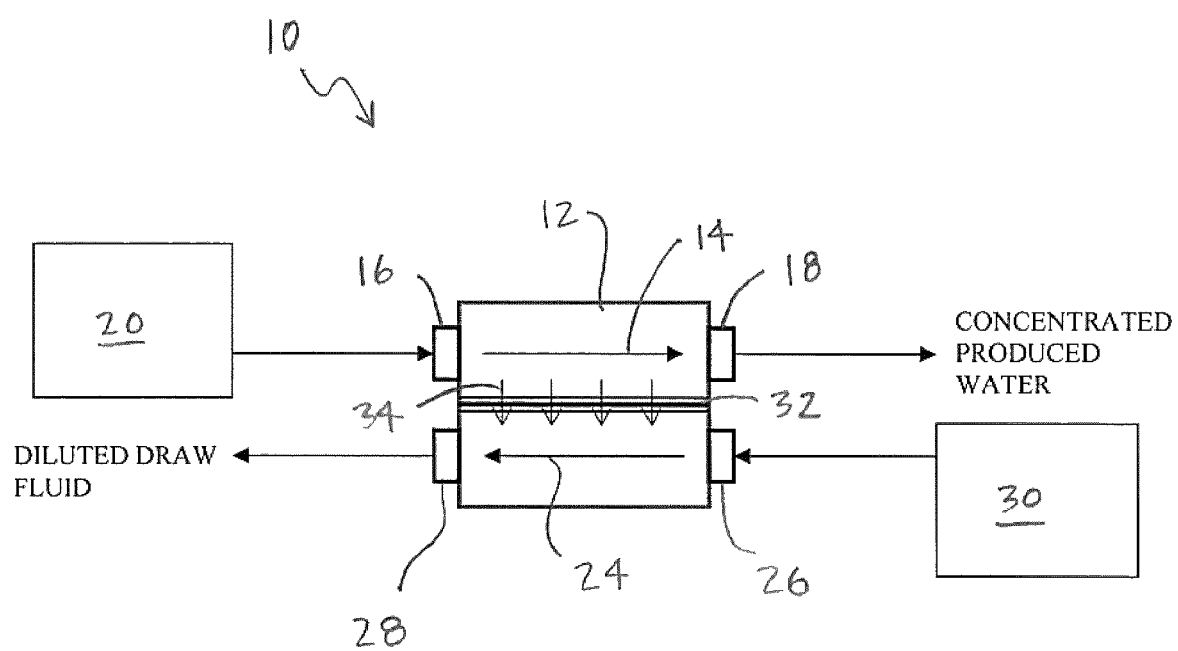
Figure 2:
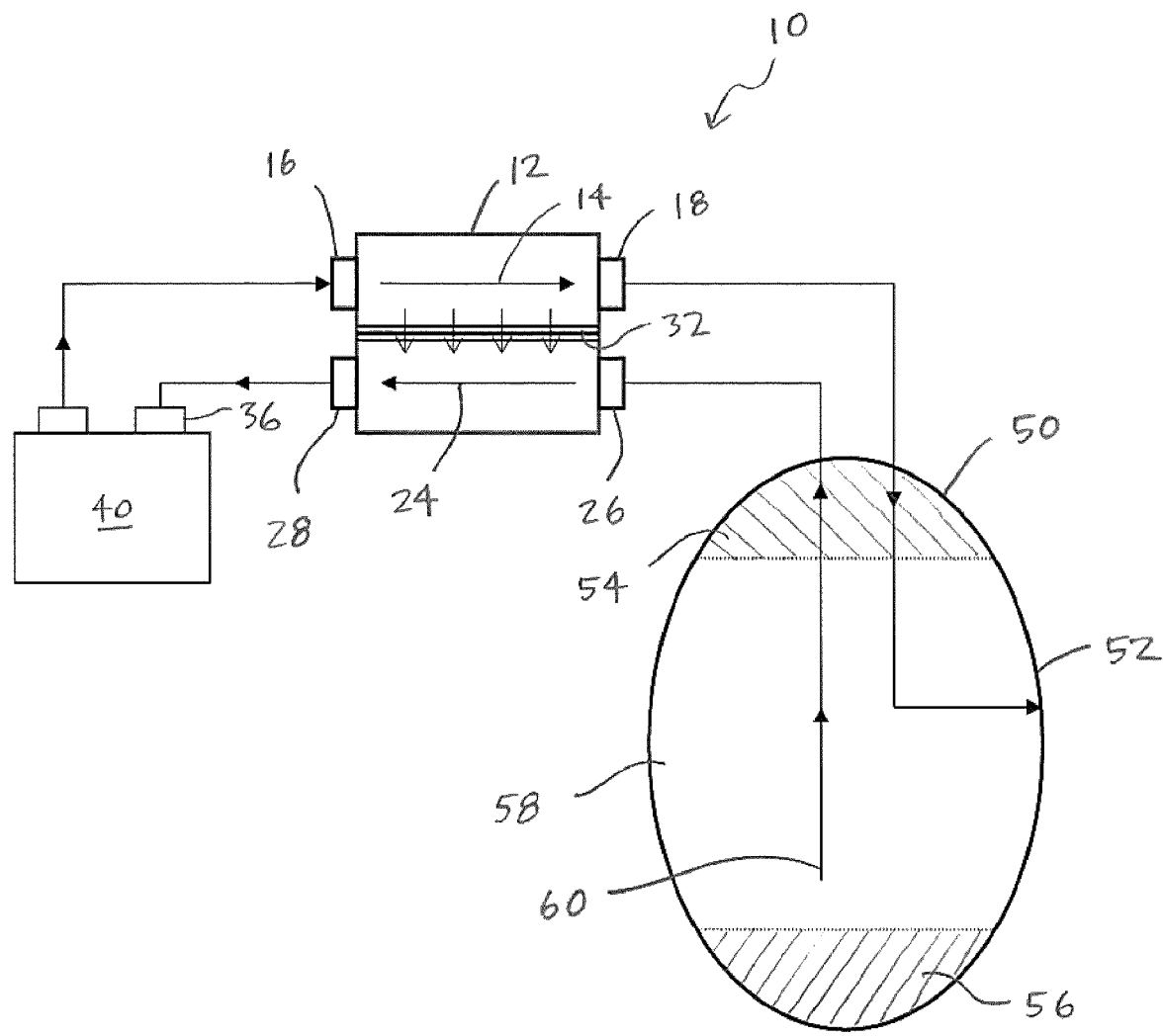
Figure 3:
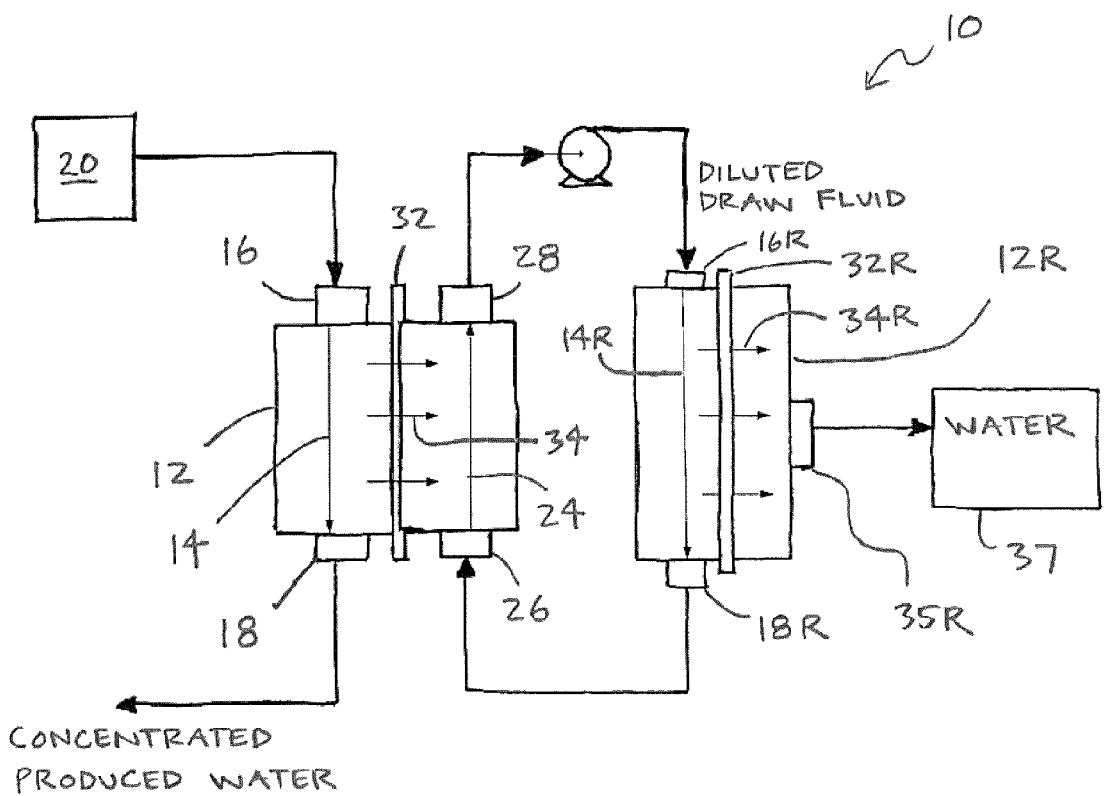
Figure 4:
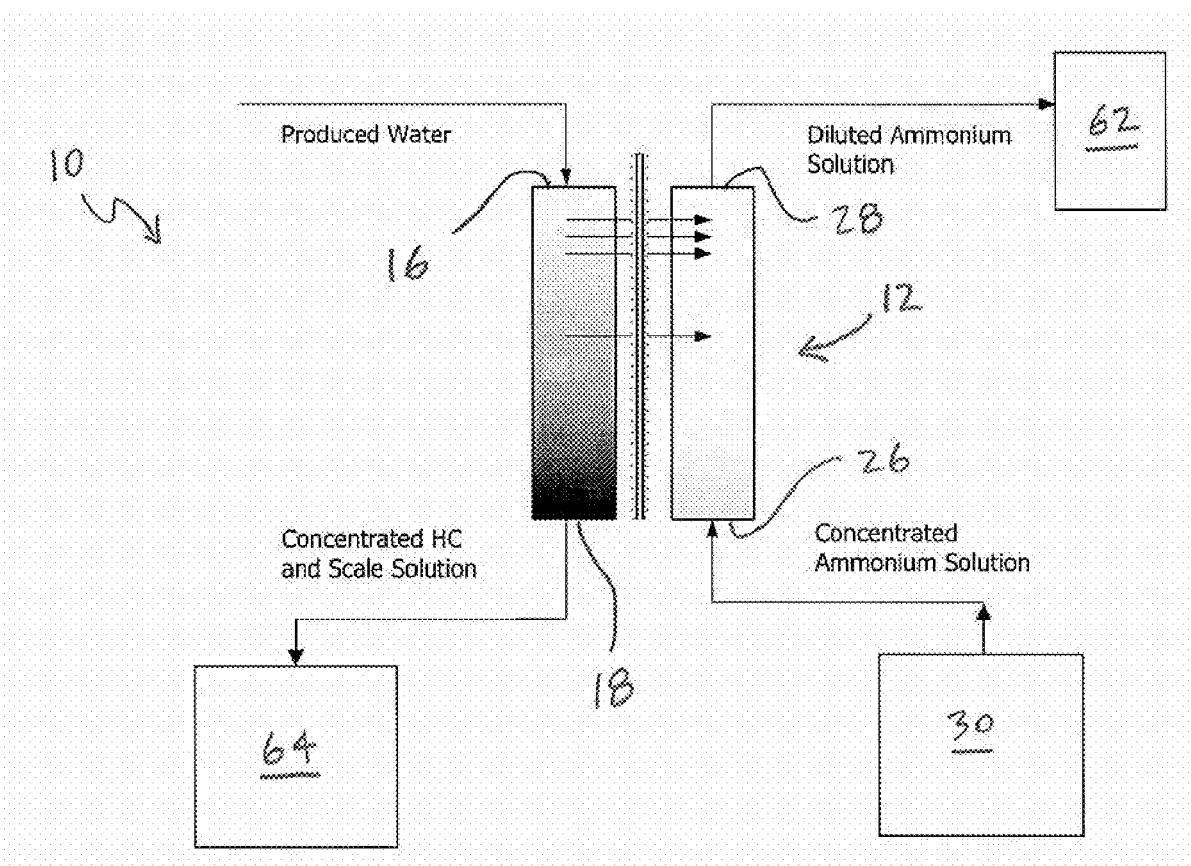
Figure 5:
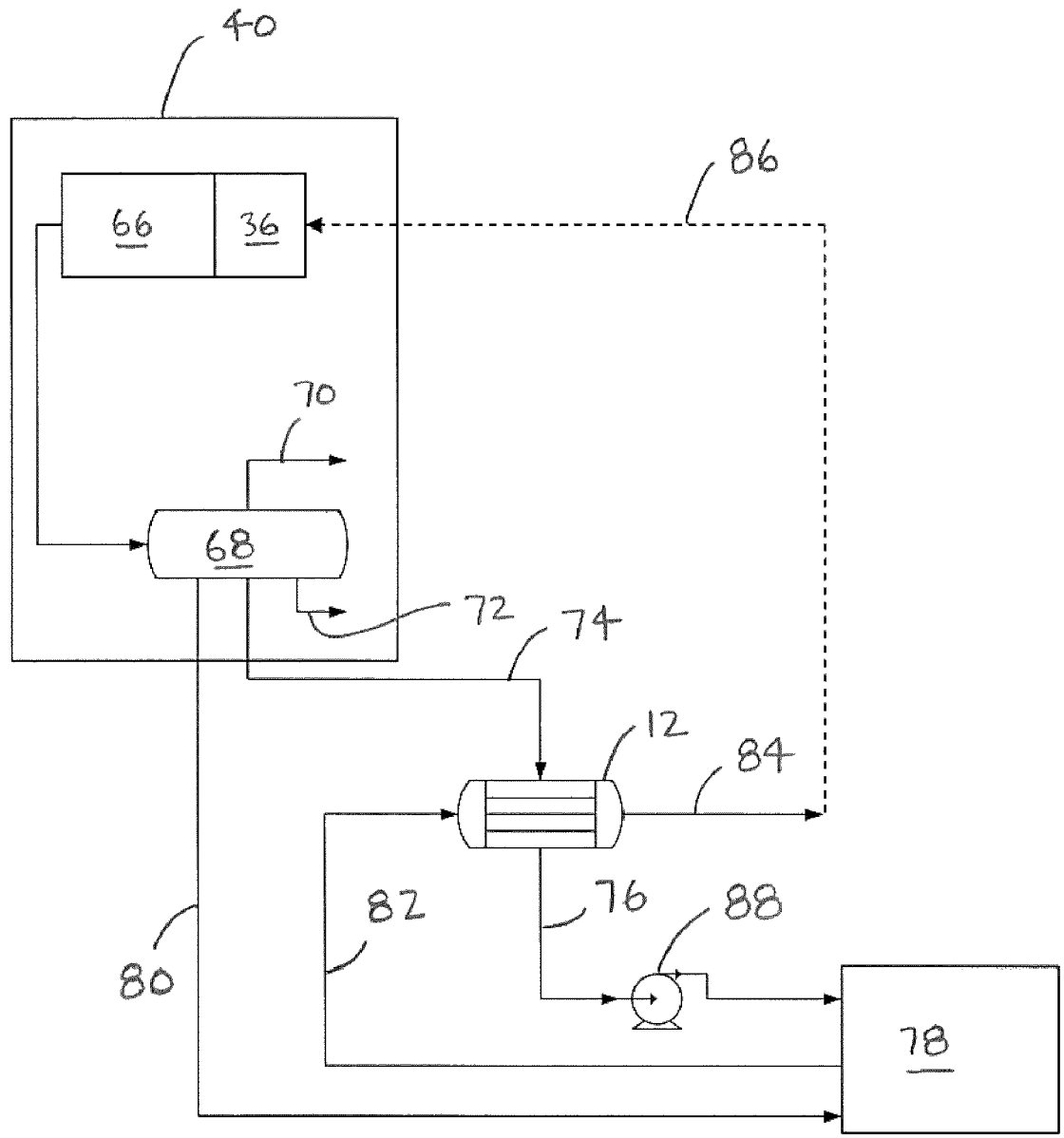
Figure 6:
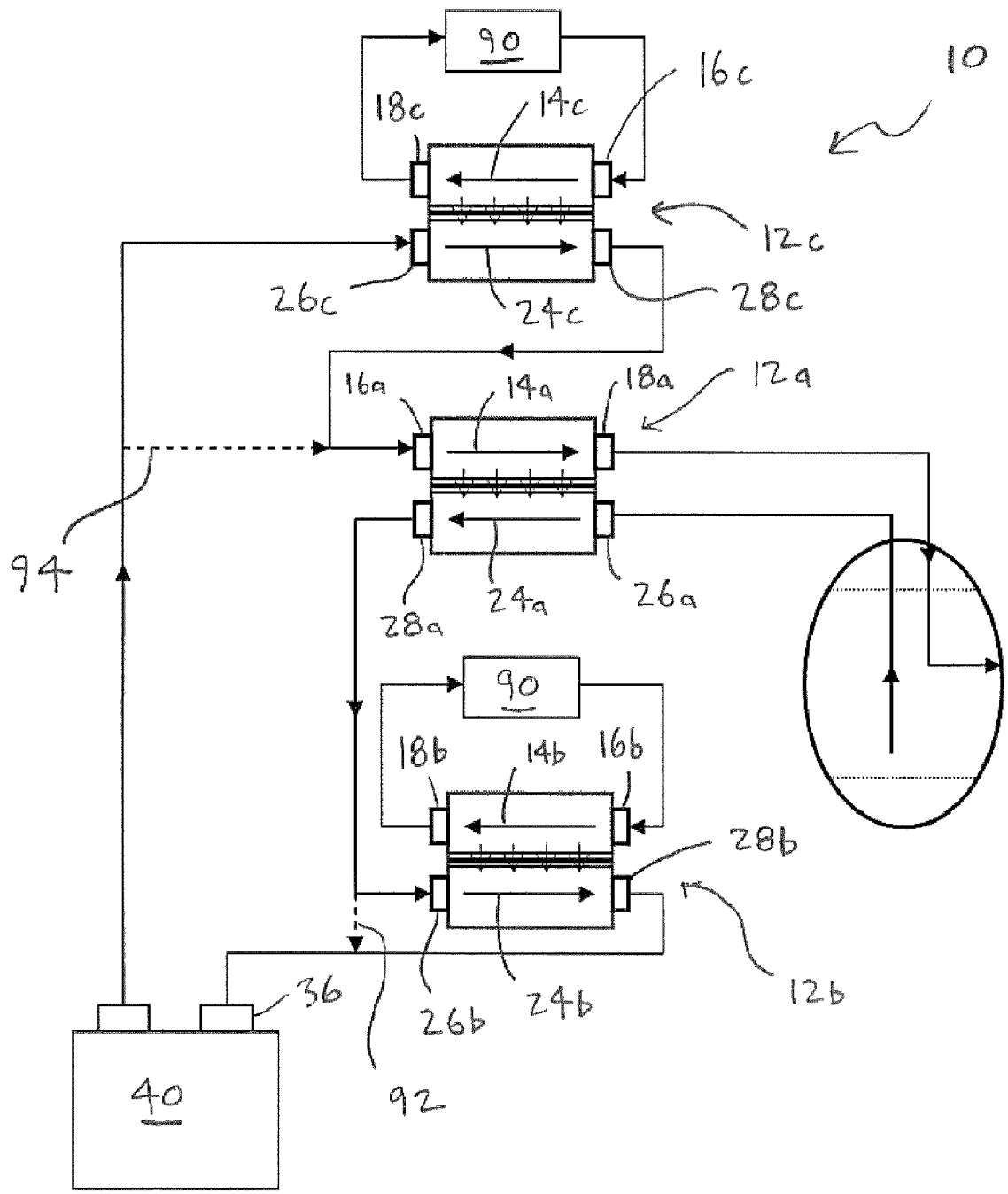
Figure 7:
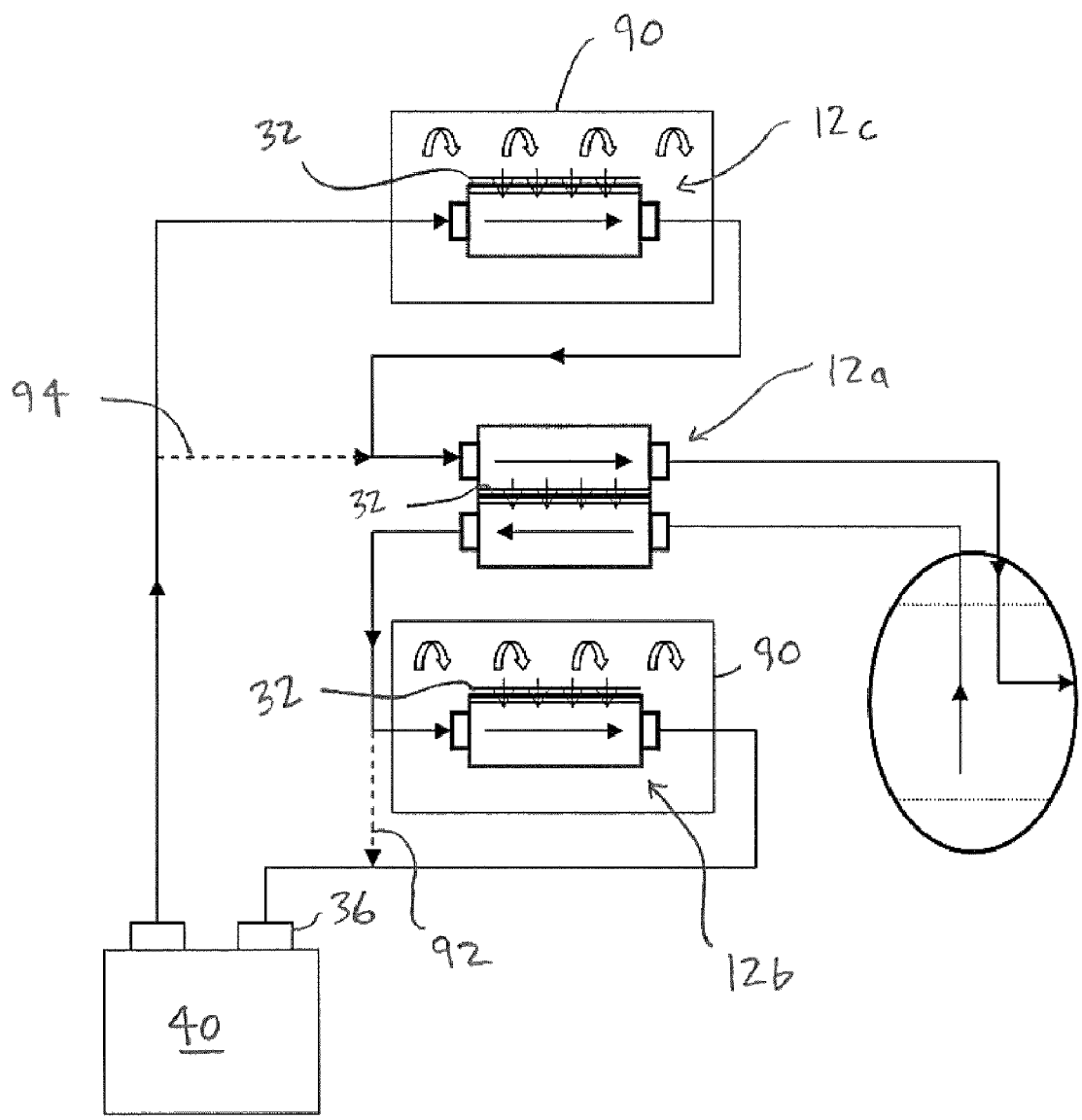

Having thus described the invention in general terms, reference will now be made to the accompanying drawings, which are not necessarily drawn to scale, and wherein:

FIG. 1 is a schematic diagram illustrating an osmotic system for performing a method of treating an aqueous stream resulting from a production of crude oil or other hydrocarbons according to one embodiment of the present invention;

FIG. 2 is a schematic diagram illustrating an osmotic system according to another embodiment of the present invention, in which an osmotic device is in fluid communication with a well and a salt mine;

FIG. 3 is a schematic diagram illustrating an osmotic system according to another embodiment of the present invention, in which an osmotic device (direct osmotic device) is in fluid communication with a second osmotic device (reverse osmotic device) to produce a water stream and a concentrated produced water stream from an aqueous stream resulting from a production of crude oil or other hydrocarbons according to another embodiment of the present invention;

FIG. 4 is schematic diagram illustrating an osmotic system according to another embodiment of the present invention, in which an ammonium solution is used;

FIG. 5 is a schematic diagram illustrating an osmotic system according to another embodiment of the present invention;

FIG. 6 is a schematic diagram illustrating an osmotic system according to another embodiment of the present invention, including multiple osmotic devices; and FIG. 7 is a schematic diagram illustrating an osmotic system according to another embodiment of the present invention, including three osmotic devices, two of which are located in an ocean or other large body of water.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the drawings and, in particular, to FIG. 1, there is schematically shown an osmotic system 10 for performing a method of treating an aqueous stream in the production of crude oil or other hydrocarbons according to one embodiment of the present invention. The osmotic system 10 generally includes an osmotic device 12 that defines multiple flow paths along which fluids can flow through the device 12 between inlets and outlets of the device 12. In particular, the device 12 of FIG. 1 defines a first flow path 14 that extends from a first inlet 16 to a first outlet 18. The first inlet 16 is connected to a first source 20, typically a source of produced water that is formed in the production of the hydrocarbons, such that a stream of the produced water can flow through the osmotic device 12 along the first flow path 14. The device 12 of FIG. 1 also defines a second flow path 24 that extends from a second inlet 26 to a second outlet 28. The second inlet 26 is connected to a second source 30, typically a source of a draw fluid having a solute (i.e., draw substance) such as salt or ammonia as described further below, such that a stream of the draw fluid can flow through the osmotic device 12 along the second flow path 24.

The osmotic device 12 can include a conventional osmotic membrane 32 for performing a direct or forward osmotic operation. Osmosis generally refers to a process in which water moves through a semi-permeable osmotic membrane that separates two solutions due to a difference in osmotic pressure, e.g., from a first solution with a relatively low solute concentration to a second solution with a relatively high solute concentration. The membrane is semi-permeable, i.e., permeable to the solvent, but not the solute. In the osmotic device 12 of FIG. 1, the first and second flow paths 14, 24 are defined separately in the device 12 and are separated by a semi-permeable osmotic membrane 32, i.e., a membrane that is permeable to water but impermeable to the draw substance (i.e., solute) so that the membrane 32 selectively passes or transfers water from produced water to the draw fluid as indicated by arrows 34 in FIG. 1.

The osmotic membrane 32 is typically formed of a semi-permeable material that is structured to allow the transfer of water from the stream of produced water while preventing the transfer of suspended and dissolved hydrocarbons and other contaminants or substances in the produced water. Thus, as the produced water flows along the first flow path 14 through the osmotic device 12 and the draw fluid flows along the second flow path 24 through the device 12, clean water from the produced water can be extracted by the draw fluid, i.e., transferred from the produced water to the draw fluid. In this way, the volumetric flow rate of the produced water is typically reduced in the osmotic device 12 so that the concentration of contaminants per volume of the produced water is increased, while the volumetric flow rate of the draw fluid is typically increased in the osmotic device 12 so that the concentration of the draw substance per volume of the draw fluid is decreased. Thus, a stream of concentrated produced water is formed along the first flow path 14 in the osmotic device 12 and delivered from the first outlet 18 of the device 12, and a stream of diluted draw fluid is formed along the second flow path 24 and delivered from the second outlet 28 of the device 12.

The streams of produced water and draw fluid are illustrated to flow in opposite directions in FIG. 1, but both fluids can alternatively flow in the same direction through the device 12. Further, while the produced water and draw fluid are illustrated to flow along straight flow paths 14, 24 through the osmotic device 12, it is understood that the device 12 can be configured so that one or both fluids instead flow along curved or otherwise circuitous routes. Also, the osmotic membrane 32 can define a planar configuration as shown in FIG. 1 or, alternatively, a non-planar configuration, e.g., so that a greater surface area of the membrane 32 is in contact with the produced water and the draw fluid as the two streams of fluids flow through the osmotic device 12.

As clean water is removed from the stream of produced water, and the concentration of suspended and/or dissolved hydrocarbons, solids, and any other contaminants in the produced water is thereby increased, the removal of the contaminants from the produced water is facilitated. While the present invention is not limited to any particular theory of operation, it is believed that the hydrocarbon in the produced water can be more easily separated from the other liquid (substantially water) phase of the produced water because any dissolved hydrocarbon in the produced water generally becomes less soluble as the mineral concentration in the solution increases, the density of the aqueous phase has increased, and the suspended hydrocarbon is more likely to coalesce in the produced water (and rise to the surface of the produced water). Similarly, as the clean water is removed from the produced water, resulting in an increase in the concentration of solids in the produced water, the concentrated solids become more likely to fall out of the produced water. Thus, the removal of the clean water from the stream of produced water increases the contaminant concentration in the produced water and thereby facilitates the subsequent removal of contaminants from the produced water. In some cases, the concentration of hydrocarbon can be increased significantly.

In some cases, the volume of the diluted draw fluid that is output from the osmotic device 12 can be about 90% of the volume of the produced water that is input into the osmotic device 12. In some cases, such as where salt is used as the draw substance, the diluted draw fluid that results from the process can be output to the ocean, e.g., with or without any additional filtering, thermal processing, or the like. The stream of concentrated produced water (which, in some cases, is reduced to a volume of less than 50%, such as about 10%, of the stream of produced water that enters the osmotic device 12) can be disposed, e.g., by injection into a suitable subterranean location. By reducing the volume of the produced water, the method can decrease the costs for disposal thereof. Alternatively, the concentrated produced water can be re-used in the osmotic operation or the hydrocarbon production operation. For example, the concentrated produced water can be treated to remove hydrocarbon and precipitants and then recycled as the draw fluid or a supplement to the draw fluid. In some cases, such as where the osmotic operation and the hydrocarbon production operation are located in proximity to a subsurface salt pinnacle formation, the process can be operated as a closed loop, e.g., the concentrated produced water can be routed to a salt cavern where contaminants are separated therefrom and the produced water is saturated with salt before reuse in the osmotic operation, as discussed below in connection with FIG. 2.

The use of direct osmosis to treat produced water as described herein generally contrasts with a typical conventional osmosis operation for cleaning a fluid, such as a conventional reverse osmosis operation for removing salt from seawater or cleaning water to produce drinking water. In contrast to such conventional osmosis operations, where the osmotic operation is used to transfer water from a supply stream to produce a clean flow of product (e.g., drinking water), the method provided by this embodiment of the present invention can instead be operated to transfer water from the produced water to reduce the produced water to a contaminated stream having increased contaminant concentration, such that the subsequent removal of contaminants is facilitated. The methods of the present invention also generally contrast to conventional methods for treating produced water that results from hydrocarbon production operations. In this regard, instead of filtering the produced water to remove the unwanted contaminants therein (as performed in conventional methods), the clean water can be removed from the produced water according to the present invention so that the unwanted contaminants remain in the produced water and are successively concentrated (and subsequent removal can be facilitated by such concentration, as described above). In other words, instead of removing contaminants to reduce their concentration in the produced water, clean water is removed to increase the concentration of contaminants in the produced water (and facilitate their subsequent removal).

FIG. 2 illustrates an embodiment of the present invention in which the osmotic system 10 is operated as a closed loop or substantially closed loop. In this embodiment, the first inlet 16 of the osmotic device 12 is fluidly connected to a hydrocarbon production operation 40, which includes a well from which crude oil or other hydrocarbons are produced, so that a stream of produced water that is generated during the production of the crude oil or other hydrocarbons can be provided from the well to the first inlet 16 of the osmotic device 12. The second inlet 26 of the osmotic device 12 is fluidly connected to a salt mine 50 in which a salt solution mining operation is performed so that a stream of salt water that is produced during the salt solution mining operation can be provided from the salt mine 50 to the second inlet 26 of the osmotic device 12 as the draw fluid. As the produced water flows through the osmotic device 12 along the first flow path 14 and the salt water flows through the device 12 along the second flow path 24, clean water is transferred through the osmotic membrane 32 from the produced water to the draw fluid of the salt water. The volume of the produced water is thereby decreased, and the volume of the salt water is increased. Further, the volumetric concentration of hydrocarbons and/or other contaminants in the produced water is increased, and the salinity of the salt water (i.e., the concentration of the draw substance in the draw fluid) is decreased.

The concentrated produced water that results from the osmotic operation is delivered from the first outlet 18, which is fluidly connected to the salt mine 50. More particularly, the concentrated produced water can be used in the salt solution mining operation that is performed in the salt mine 50, e.g., by directing a flow of the concentrated produced water toward the walls 52 or other formations of the salt mine 50 to remove salt therefrom and increase the salinity of the concentrated produced water. The concentrated produced water can be stratified, e.g., by collecting the concentrated produced water in the salt mine 50 (as shown in FIG. 2) or in another container and allowing the hydrocarbons in the concentrated produced water to rise to an upper level 54 and allowing solids in the concentrated produced water to sink to a lower level 56.

The stream of the draw fluid that is provided to the second inlet 26 of the osmotic device 12 can be removed from an intermediate level 58 in the salt mine 50, i.e., via an inlet 60 located between the upper level 54 where the hydrocarbons collect and the lower level 56 where the solids collect. In some cases, the salt water that is provided as the draw fluid can be at least saturated (i.e., saturated or supersaturated) with salt. In one embodiment, the draw fluid provided to the osmotic device 12 can have a concentration between 10% and 50% by weight of NaCl or other draw substance, such as a concentration of about 26% by weight for water saturated with NaCl. The produced water delivered to the osmotic device 12 typically has a much lower concentration of draw substance, such as a concentration of NaCl of less than 10% by weight, e.g., a concentration between about 2% and 3% by weight.

As noted above, the salinity of the salt water is then decreased in the osmotic device 12 as the salt water receives water through the osmotic membrane 32 from the produced water. As shown in FIG. 2, the second outlet 28 of the osmotic device 12 can be fluidly connected to the hydrocarbon production operation 40, e.g., to the well, so that the diluted salt water can be provided to the production operation and used in the production of the crude oil or other hydrocarbons. For example, the diluted salt water can be used in an enhanced oil recovery operation, in which the diluted salt water is provided to an injector 36 to be injected into the well and/or used to flood the well to improve or enhance oil recovery. The diluted salt water typically contains little or no scale, oxygen, biological life, hydrocarbons, sulfates, and the like.

Compared to a conventional enhanced oil recovery operation that uses treated seawater for injection into a well, the use of the diluted draw fluid provided by the methods of the present invention can reduce the required processing and, in some cases, allow the process to be performed without the use of de-oiling hydrocyclones or other separation or processing devices that are conventionally used in enhanced oil recovery operations. Further, the diluted draw fluid can provide other advantages relative to the use of seawater. For example, if salt is used as the draw substance, the existence of living organisms is typically low in the draw fluid, such as where the draw fluid originates as a saturated salt solution and is diluted in the osmotic device 12. Thus, the amount of biocide required for treating the draw fluid can be reduced compared to the treatment of seawater. In addition, because the produced water is normally free of oxygen, no de-oxygenation processing step or oxygen scavenger is typically required. Further, sulfate removal is not typically required, and the draw fluid is typically not prone to scaling. If desired, some or all of the "scaling" minerals that are separated from the concentrated produced water can be added back to the diluted draw fluid before use in the enhanced oil recovery operation.

If a cavern of a salt mine is used to facilitate the separation of the concentrated produced water, as described in connection with FIG. 2, the cavern will typically be warm due to the thermal energy at the depth of the cavern, e.g., about 170° F. in some cases. Such caverns can be large, e.g., about 1,000,000 barrels or larger in volume, such that great quantities of fluid can be separated therein. Further, it is appreciated that, if the concentrated produced water dissolves salt in the cavern, the resulting increase in the salinity of the concentrated produced water can decrease the hydrocarbon solubility of the concentrated produced water and thereby facility the removal of hydrocarbons. Thus, the hydrocarbon will stratify according to differences in gravity and will also become less soluble in the concentrated produced water.

Relative to a typical excavation of a cavern of a salt mine using fresh water or seawater, the excavation of the mine 50 using the concentrated produced water can proceed more slowly due to the higher salinity (e.g., 12%) of the concentrated produced water. In some cases, this can extend the useful life of the mine 50 since the salt is used more slowly. Further, it is appreciated that such a process for solution mining of a mine can be used in combination with other operations where the formation of a cavern is advantageous. For example, after the salt is mined to form the cavern, the cavern can be used as a large, warm storage vessel for liquids or vapors in a hydrocarbon production operation or otherwise.

The system 10 of FIG. 2 is illustrated as a closed-loop system, i.e., a system in which the same water is re-used in the well and the mine 50 so that no additional source of water is required for the system 10 and no water is output from system 10. In some cases, the system 10 can be operated as a substantially closed-loop system, i.e., in which water is re-used in the well and the mine 50 while a relatively small amount of water, such as 5% or less of the produced water, is input to or output from the system, e.g., to replace water leakage from the system, evaporative losses, and the like. For example, in one substantially closed-loop system, evaporative losses of water to the ambient air are offset by additions of water to the system, but the water is otherwise re-used without any significant extraction of water from the system or addition of water to the system. In a closed-loop system such as the system 10 of FIG. 2, the produced water from the well can be derived from a large reservoir, such that water injected into the well is greatly diluted in the reservoir. In other embodiments, the system 10 can instead be operated as an open-loop system, e.g., by drawing salt water from an ocean or other body of water for use as the draw fluid and then dispensing the diluted draw fluid, e.g., back to the same body of water.

The salt water used as the draw fluid in the embodiment of FIG. 2 can be formed with various different salts, such as chlorides, nitrates, or carbonates, e.g., sodium chloride (NaCl), magnesium chloride ($MgCl_2$), calcium chloride ($CaCl_2$), potassium chloride (KCl), potassium nitrate ($KNO_3$), ammonium bicarbonate ($NH_4HCO_3$), ammonium nitrate ($NH_4NO_3$) and the like, including hydrates thereof. Further, in other embodiments, the draw fluid (which can be referred to as a "draw engine") can contain a draw substance other than a salt, such as sucrose, starch, or any solute concentration creating an osmotic gradient or other driving force for water transport across a membrane. In any case, the draw fluid typically includes a draw substance that provides an affinity for water, such that the draw fluid draws or extracts water from the produced water in the osmotic device 12. The removal of uncontaminated water from the produced water reduces the volume of contaminated produced water for further processing, use, storage, or disposal. In some cases, the volume of the concentrated produced water output from the osmotic device 12 can be less than 50% (such as about 10%) of the volume of the produced water entering the osmotic device 12. In addition, as described above, the removal of the water from the produced water increases the concentration of the hydrocarbons, solids, and other contaminants therein on a volumetric basis.

FIG. 3 illustrates an osmotic system 10 for performing a method of operation similar to the method described above in connection with the system 10 of FIG. 1. As illustrated, produced water, which is typically derived from a hydrocarbon production operation 20, enters the first inlet 16 of the osmotic device 12. The draw fluid that enters the second input 26 of the osmotic device 12 is a concentrated salt solution that includes NaCl. In the osmotic device 12, water is transferred from the produced water to the draw fluid. The concentrated produced water output from the first outlet 18 of the device 12 (e.g., a concentrated hydrocarbon and scale solution) typically includes a higher concentration of dissolved solids and/or hydrocarbon. The diluted draw fluid, exits the second outlet 28 of the osmotic device 12 and is then sent, via a pump 15, to a second osmotic device 12R, which is a reverse osmotic device with an inlet 16R and two outlets 18R and 35R.

The reverse osmotic device 12R of FIG. 3 defines multiple flow paths along which fluids can flow through the device 12R between the inlet 16R and the outlets 18R and 35R of the device 12R. In particular, the device 12R defines a first flow path 14R that extends from the inlet 16R to the first outlet 18R. The inlet 16R is configured to receive the diluted draw fluid from the first osmotic device 12, such that a stream of the diluted draw fluid can flow through the osmotic device 12R along the first flow path 14R. A reserve osmotic operation is performed in the second device 12R to remove clean water from the fluid flowing along the flow path 14R. For example, a pressure can be provided to the fluid flowing along the first flow path 14R so that clean water is transferred by reverse osmosis through the osmotic membrane 32R in the direction 34R, and out of the second outlet 35R to a water collection vessel 37. The fluid exiting the outlet 18R, having lost some water in the device 12R, is a concentrated draw fluid that is provided to the second inlet 26 of the first osmotic device 12 for receiving water therein.

While the embodiment of FIG. 3 exemplifies a method in which salt (and, more particularly, NaCl) is used as the draw substance in the draw fluid, other substances can be used instead. In this regard, FIG. 4 illustrates an embodiment in which the second fluid source 30 is configured to provide a fluid comprising ammonia to the second inlet 26 of the osmotic device 12 as the stream of draw fluid. The second fluid source 30 can be a supply of a fertilizing agent that includes a concentrated ammonium solution, anhydrous ammonia, ammonium nitrate, ammonium sulfate, phosphate, urea, nitrogen solutions, potash, other nutrients, and/or the like. If the fertilizing agent is a concentrated ammonium solution, the concentrated ammonium solution can include ammonia ions, e.g., formed by mixing anhydrous ammonia with water to produce the ammonium ions. The concentrated ammonium solution acts as the draw fluid in the osmotic device 12, such that the water is transferred from the produced water to the concentrated ammonium solution, thereby diluting the ammonium solution that is output at the second outlet 28 and concentrating the produced water that is output at the first outlet 18. The stream of diluted draw fluid, i.e., diluted ammonium solution, that is output at the second outlet 28 can be used as a fertilizer, e.g., by delivering the diluted ammonium solution directly to a farming operation in the vicinity of the osmotic operation, or by delivering the diluted ammonium solution to a fertilizer receiver 62 such as a storage tank that is configured to receive the diluted ammonium solution until it is transported and used as a fertilizer. The concentrated produced water can be delivered to a receiver 64, such as a storage container, processing facility, mine, or the like for storage and/or further use.

FIG. 5 illustrates a system 10 according to another embodiment of the present invention, in which a production fluid from a hydrocarbon production operation 40 is processed according to one method of the present invention. The hydrocarbon production operation 40, which typically includes a well 66, provides a stream of the production fluid, which can include crude oil, natural gas, water, and various solids or contaminants. The production fluid from the well 66 is delivered to a production separator 68, which separates the production fluid to provide streams of gas and oil to outlets 70, 72 for further processing, storage, and/or use. At least some of the remaining fluid, which typically includes water with some hydrocarbons and contaminants, is delivered as produced water to the osmotic device 12 via line 74, where water is removed to concentrate the produced water. The concentrated produced water is then delivered via line 76 to a separation volume 78, i.e., a space or device that receives the concentrated produced water, and is stratified in the separation volume 78. The separation volume 78 can be a cavern of a salt mine, as described above in connection with FIG. 2, and salt or another draw substance can be added to the concentrated produced water in the separation volume 78. In some cases, a stream of produced water can also be provided from the production separator 68 to the separation volume 78 via line 80 directly, i.e., without passing through the osmotic device 12. The draw fluid (which, in this example, is the concentrated produced water after stratification and/or addition of the draw substance in the separation volume 78) is provided from the separation volume 78 to the osmotic device 12 via line 82 for removal of water from the produced water, as described above. The diluted draw fluid can then be discarded, e.g., by discharge via line 84 into a body of water, stored, or re-used in the operation. In some cases, the diluted draw fluid or water from another source is provided to the injector 36 and/or well 66 of the hydrocarbon production operation 40 as an enhanced oil recovery fluid, e.g., as indicated by reference numeral 86. The various fluids can be transported throughout the system 10 using pumps, e.g., a pump 88 located between the osmotic device 12 and the separation volume 78, as shown in FIG. 5. It is appreciated that one or more pumps can be provided at various locations throughout the systems 10 of the present invention.

In some cases, multiple osmotic devices can be used to perform multiple osmotic operations. In this regard, FIG. 6 illustrates another system of the present invention having a first osmotic device 12a, which is similar to the osmotic device 12 described above, and second and third osmotic devices 12b, 12c that can also be structurally similar to the osmotic device 12. The first osmotic device 12a is configured to receive a flow of produced water along its first flow path 14a between its first inlet 16a and first outlet 18a, and a flow of a draw fluid along its second flow path 24a between the second inlet 26a and second outlet 28a. The second and third osmotic devices 12b, 12c can be configured to receive the produced water and/or the draw fluid before and/or after those fluids are delivered through the first osmotic device 12a. The terms "first," "second," and "third" are used to distinguish the multiple osmotic devices but do not necessarily indicate the order in which the fluids pass therethrough.

For example, the second outlet 28a of the first osmotic device 12a is connected to the second inlet 26b of the second osmotic device 12b so that the diluted draw fluid is delivered from the first osmotic device 12a to the second osmotic device 12b for successive osmotic operations. In other words, after the draw fluid is diluted in the first osmotic device 12a, the diluted osmotic fluid can be delivered to the second osmotic device 12b where it is further diluted. The osmotic operation in the first osmotic device 12a can be performed to concentrate the produced water, and the subsequent osmotic operation in the second osmotic device 12b can be performed to transfer water from another stream (such as a stream of salt water) to the diluted draw fluid to thereby further dilute the draw fluid and increase the volume of the diluted draw fluid. For example, in one embodiment, the draw fluid entering the first osmotic device 12a is saturated with NaCl to have a concentration of about 26% by weight of NaCl, the produced water entering the first osmotic device 12a has a concentration of about 6% NaCl by weight, the concentrated produced water exiting the first osmotic device 12a has a concentration of about 12% NaCl by weight and a volume of about 50% of the produced water entering the first osmotic device 12a, and the diluted draw fluid has concentration of between about 15% and 17% NaCl by weight. The diluted draw fluid is then delivered to the second osmotic device 12b. In the second osmotic device 12b, a stream of supply water, such as seawater having a salinity of about 3%, flows along the first flow path 14b, and the diluted draw fluid flows along the second flow path 24b, such that water is transferred by a direct osmotic process from the seawater to the diluted draw fluid. The seawater loses water, and the concentrated seawater that results in discharged from the first outlet 18b of the device 12b, e.g., to be discharged back to an ocean 90 or other body of water where the stream of supply water originates.

The diluted draw fluid can be further diluted in the subsequent osmotic operation performed in the second osmotic device 12b to provide a further diluted draw fluid that exits the second outlet 28b of the device 12b. In this way, the salinity of the draw fluid is further reduced, and a supply of low salinity water can be provided via outlet 28b, e.g., for re-use in the hydrocarbon production operation 40, for use in farming, or the like. The osmotic operation performed in the second osmotic device 12b can allow the transfer of clean water from the supply water to the diluted draw fluid so that organic matter or other contaminants in the supply water (e.g., plant or animal matter in the seawater) is not transferred to the diluted draw fluid. Thus, the further diluted draw fluid can be clean relative to the supply water and useful in enhanced oil recovery operations, farming, or other applications where untreated seawater or another supply water might be inappropriate. If the second osmotic device 12b is to be partially or entirely bypassed (or is omitted from the system 10), line 92 can be provided for receiving the diluted draw fluid and further directing the diluted draw fluid, e.g., back to the hydrocarbon production operation 40.

In addition or alternative, the produced water can be used in an osmotic process to draw clean water from seawater or another supply water. For example, as also shown in FIG. 6, the produced water can be delivered through the third osmotic device 12c along the second flow path 24c prior to being received in the first osmotic device 12a. The third osmotic device 12c can receive a flow of the seawater along the first flow path 14c, so that clean water from the seawater is osmotically transferred to the concentrated produced water, thereby decreasing the salinity of the produced water and increasing the volume of the produced water (i.e., diluted produced water). The diluted produced water can then be output via the second outlet 28c and used in a process that includes processing the diluted produced water in the first osmotic device 12a, processing the diluted draw fluid in the second osmotic device 12b, and/or reusing the diluted produced water, diluted draw fluid, and/or further diluted draw fluid, e.g., in an enhanced oil recovery operation. If the third osmotic device 12c is to be partially or entirely bypassed (or is omitted from the system 10), line 94 can be provided for directing the produced water from the hydrocarbon production operation 40 directly to the first inlet 16a of the first osmotic device 12a.

As illustrated in FIG. 6, the supply water (e.g., seawater) passing through the second and third osmotic devices 12b, 12c is provided as a stream of fluid that is pumped through the devices 12b, 12c. In other embodiments, one or more of the devices 12a, 12b, 12c can instead be disposed within a body of water so that one fluid is pumped through an interior passage of the respective device 12a, 12b, 12c while the other fluid surrounds the device 12a, 12b, 12c. In this regard, FIG. 7 illustrates a system configured to perform three osmotic operations, similar to those described above in connection with FIG. 6; however, each of the second and third osmotic devices 12b, 12c is located in an ocean or other body of water 90 (e.g., submerged in the ocean) so that the osmotic membranes 32 of the devices 12b, 12c are exposed to seawater. The seawater can circulate freely around the devices 12b, 12c so that seawater having a relatively low salinity is supplied to the devices 12b, 12c in contact with the membranes 32 for providing clean water through the osmotic processes.

It is appreciated that different osmotic pressures can be provided in the osmotic device 12 using different types of draw fluids that contain different draw substances, such as magnesium chloride ($MgCl_2$), calcium chloride ($CaCl_2$), sodium chloride (NaCl), potassium chloride (KCl), sucrose, potassium nitrate ($KNO_3$), and ammonium bicarbonate ($NH_4HCO_3$). The term "osmotic pressure" generally refers to the hydrostatic pressure that is produced in an osmotic operation due to the difference in concentrations of the draw substance across the semi-permeable membrane 32. The produced water typically contains a relatively low concentration of the draw substance, and the osmotic pressure generally increases as the concentration of the draw substance in the draw fluid is increased. Additionally, the osmotic pressure achieved by the use of some draw fluids is greater than the osmotic pressure achieved by other draw fluids. For example, at a temperature of 25° C., the osmotic pressure provided by draw fluids having 2 molar (M) and 4 M concentrations of NaCl are about 100 atmospheres and 400 atmospheres, respectively. At a temperature of 25° C., the osmotic pressure provided by draw fluids having 2 M and 4 M concentrations of $MgCl_2$ are about 250 atmospheres and 1450 atmospheres, respectively. For the operation illustrated in FIG. 2, the concentrated salt solution that is used as the draw fluid (including 260,000 ppm NaCl) provides an osmotic pressure of about 400 atmospheres.

The rate of osmosis that occurs in the osmotic device 12 is determined, at least in part, by the osmotic pressure and, hence, by the concentration of the draw substance in the draw fluid. Thus, the water flux varies for different concentrations of NaCl or other draw substance in the draw fluid. The term "water flux" refers to the volumetric rate of water transfer from the produced water to the draw fluid per area of the semi-permeable membrane 32 and per time. The water flux generally increases with greater draw solution concentrations. The water flux can also depend in part on the produced water (or other fluid) that is processed in the osmotic device 12. For example, the water flux can generally be relatively higher when the draw fluid is used to osmotically remove water from a stream of water that is relatively clean and relatively lower when the draw fluid is used to osmotically remove water from a stream that is relatively less clean. For example, the water flux can be higher when the draw fluid is used to osmotically remove water from a stream of deionized water feed than for less clean feeds such as a hygiene feed (derived from household cleaning) or a hygiene/urine/humidity feed, i.e., a feed that includes hygiene feed, urine feed (derived from biological excretions), and/or humidity feed (derived from condensate reclaimed from an air-condensing heat exchanger).

Many modifications and other embodiments of the inventions set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An osmotic method for treating an aqueous stream in the production of hydrocarbon, the method comprising:
providing a stream of produced water formed in a production of hydrocarbon, the produced water including dissolved minerals and hydrocarbon;
providing a stream of draw fluid; and
performing a direct osmotic operation between the produced water and the draw fluid by exposing the produced water and the draw fluid to opposite sides of a semi-permeable osmotic membrane to transfer water from the produced water to the draw fluid, thereby diluting the draw fluid to form a stream of diluted draw fluid and concentrating the produced water to form a stream of concentrated produced water, further comprising directing the concentrated produced water to a salt solution mining operation; producing a stream of salt water in the salt mining operation, and directing the salt water from the mining operation as a stream of draw fluid.

2. An osmotic method according to claim 1 wherein the method is a substantially closed-loop operation, further comprising:
injecting the diluted draw fluid into a well in an enhanced oil recovery operation for the production of hydrocarbon, wherein the stream of produced water is produced from the well; and
using the concentrated produced water in a salt solution mining operation, wherein the stream of draw fluid is a stream of salt water produced from the salt solution mining operation.

3. An osmotic method according to claim 2, further comprising stratifying the concentrated produced water in a salt mine such that hydrocarbons in the concentrated produced water rise to an upper level in the salt mine, solids in the concentrated produced water sink to a lower level, and the stream of draw fluid is provided from an intermediate level between the upper and lower levels.

4. An osmotic system for treating an aqueous stream in the production of hydrocarbon, the system comprising:
an osmotic device defining a first flow path extending from a first inlet to a first outlet, and a second flow path extending from a second inlet to a second outlet, the first inlet configured to receive a stream of produced water formed in a production of hydrocarbon, the second inlet configured to receive a stream of draw fluid, wherein the osmotic device comprises a semi-permeable osmotic membrane disposed between the first and second flow paths, such that the osmotic device is configured to perform a direct osmotic operation between the produced water flowing along the first flow path and the draw fluid flowing along the second flow path to transfer water from the produced water through the membrane to the draw fluid, thereby diluting the draw fluid to form a stream of diluted draw fluid and concentrating the produced water to form a stream of concentrated produced water;

wherein the first outlet is fluidly connected to a salt solution mine such that the concentrated produced water is provided to a salt solution mining operation to produce a salt solution which is directed through a conduit directing the salt solution to the second flow path as the draw fluid, such that the system is a substantially close loop system.

5. An osmotic system for treating an aqueous stream in the production of hydrocarbon, the system comprising:

an osmotic device defining a first flow path extending from a first inlet to a first outlet, and a second flow path extending from a second inlet to a second outlet, the first inlet configured to receive a stream of produced water formed in a production of hydrocarbon, the second inlet configured to receive a stream of draw fluid, wherein the osmotic device comprises a semi-permeable osmotic membrane disposed between the first and second flow paths, such that the osmotic device is configured to perform a direct osmotic operation between the produced water flowing along the first flow path and the draw fluid flowing along the second flow path to transfer water from the produced water through the membrane to the draw fluid, thereby diluting the draw fluid to form a stream of diluted draw fluid and concentrating the produced water to form a stream of concentrated produced water;

wherein the second outlet is fluidly connected to an injector configured to inject the diluted draw fluid into a well in an enhanced oil recovery operation for the production of hydrocarbon, and the stream of produced water is produced from the well, and the first outlet is fluidly connected to a salt mine such that the concentrated produced water is provided to a salt solution mining operation in the mine, and the stream of draw fluid is a stream of salt water produced from the salt solution mining operation, such that the system is a substantially closed-loop system.

* * * * *